Feb. 9, 1932. F. D. CHAPMAN 1,844,347
OSCILLATORY HEATER MIXER
Filed March 24, 1930  2 Sheets-Sheet 1

INVENTOR.
Frank D. Chapman
BY
Morsell, Keeney & Morsell
ATTORNEYS.

Feb. 9, 1932. F. D. CHAPMAN 1,844,347
OSCILLATORY HEATER MIXER
Filed March 24, 1930  2 Sheets-Sheet 2

INVENTOR.
Frank D. Chapman
BY
Morsell, Keeney & Morsell
ATTORNEYS.

Patented Feb. 9, 1932

1,844,347

UNITED STATES PATENT OFFICE

FRANK D. CHAPMAN, OF BERLIN, WISCONSIN

OSCILLATORY HEATER MIXER

Application filed March 24, 1930. Serial No. 438,547.

This invention relates to improvements in oscillatory heater mixers more particularly, although not solely, adapted for batch heating or cooking corn removed from the ears.

It is one of the objects of the present invention to provide an oscillatory heater mixer in which means are positioned within the tank which agitate the material while it is directing a heating medium into the material.

A further object of the invention is to provide an oscillatory heater mixer in which the heating of the material may be started during the initial filling of the tank without scorching any of the material.

A further object of the invention is to provide an oscillatory heater mixer in which the material is agitated by oscillating radial arms and steam directing tubes to expeditiously heat all portions of the material to a uniform temperature.

A further object of the invention is to provide an oscillatory heater mixer having a brine tank for directly charging the batch of material being mixed with a measured quantity of brine.

A further object of the invention is to provide an oscillatory heater mixer in which the amount of brine to be mixed with the batch of material in the tank is visible to and under the control of the operator.

A further object of the invention is to provide a combined heater and mixer for materials such as corn and liquid, wherein the mixing device is movable only through the lower portion of the batch of mixture and the heating fluid is simultaneously injected, so as to permit the air to escape upwardly through the mixture while the heating fluid follows the escaping air.

A further object of the invention is to provide an oscillatory heater mixer having an angled bottom portion for directing the material towards the discharge end of the tank.

A further object of the invention is to provide an oscillatory heater mixer which is of simple construction, is strong and durable and is well adapted for the purpose described.

With the above and other objects in view the invention consists of the improved oscillatory heater mixer and its parts and combinations as set forth in the claims, and all equivalents thereof.

In the accompanying drawings in which the same reference characters indicate the same parts in all of the views.

Figure 1:
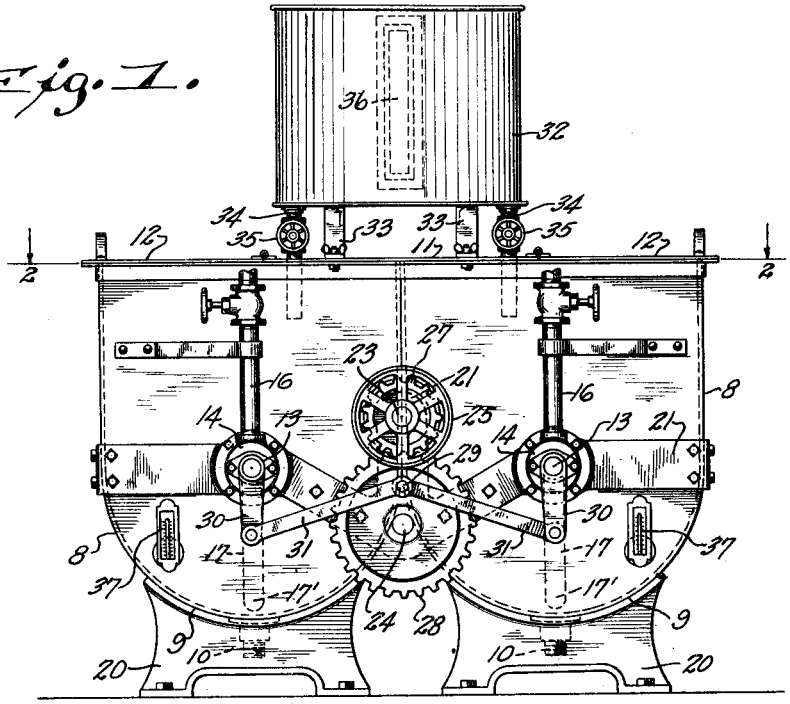
Fig. 1 is a front view of the improved oscillatory heater mixer.
Figure 2:
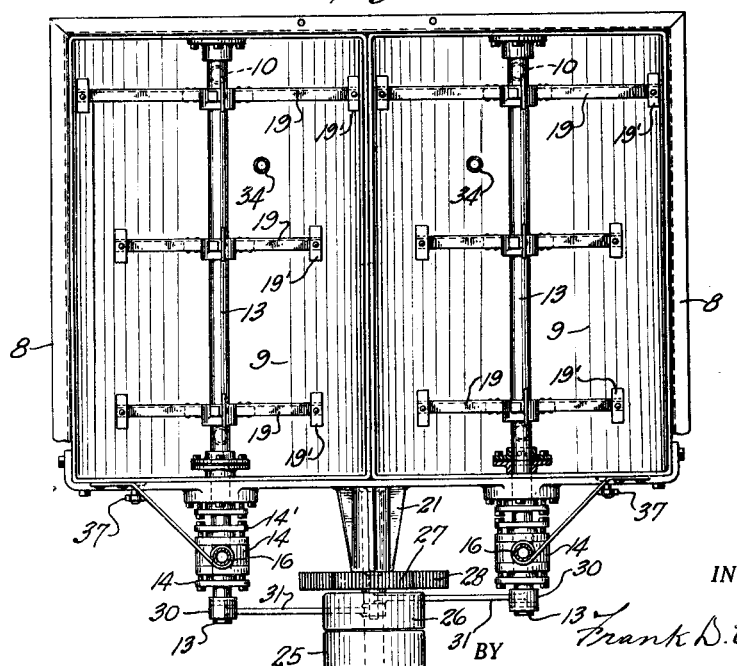
Fig. 2 is a horizontal sectional view taken on line 2—2 of Fig. 1, a portion of the tank flange being removed.
Figure 3:
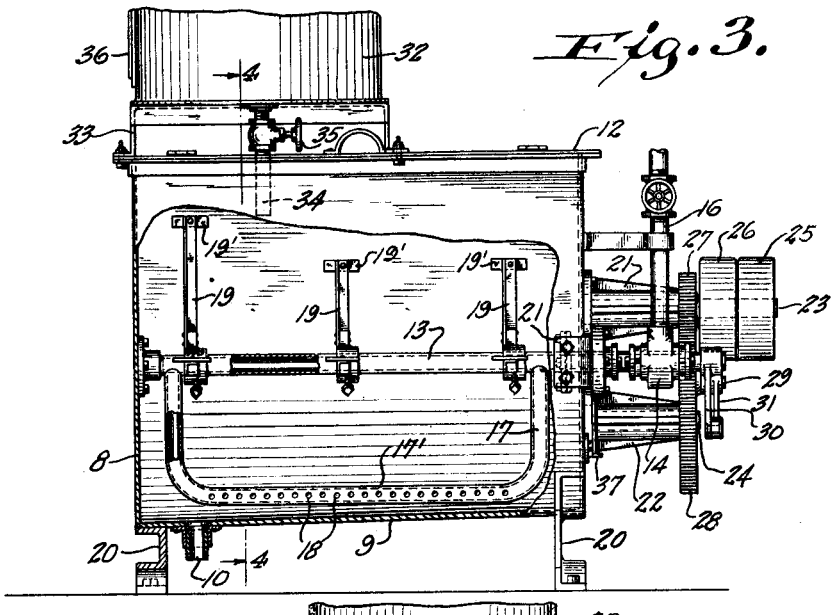
Fig. 3 is a side view of the heater mixer, parts broken away to show interior construction.

Referring to the drawings the numeral 8 indicates a pair of tanks having curved bottom portions 9 which incline downwardly rearwardly towards the rear discharge openings 10 to facilitate the flow of the material therethrough. The tanks are provided with a joint top cover 11 having hinged cover portions 12 to permit charging the tanks with the material to be sterilized or cooked.

The tanks have horizontally extending tubular rock shafts 13 journaled therein and the outer end portions of the tubular shafts, outside of the tanks, extend through and are journaled in T-couplings 14. The couplings have opposite end stuffing nuts 14' through which the tubular rock shafts 13 extend to form steam tight bearing joints between the parts. The portions of the tubular shafts 13 between the stuffing nuts have openings 15 formed therein which are in register with tubes 16 threaded into the couplings and extending to a source of steam supply. Within the tanks the tubular shafts have connected thereto downwardly extending U-shaped tubes 17, the lower horizontally extending portions 17' of which are perforated as indicated by the numeral 18 to direct jets of steam into material within the tank. The loops or U-shaped tubes 17 are rigidly connected to and receive steam from the tubular rock shafts 13 and the lower perforated portions extend adjacent and substantially parallel to the bottom portions of the tank so that as they are rocked by the shafts 13 the perforated portions will agitate and mix the material while at the same time they will direct jets of steam into the material.

The rock shafts are also provided with vertically and horizontally extending arms 19 having paddles 19′ mounted on their outer end portions which rock with the shafts to agitate and mix the material.

Figure 4:
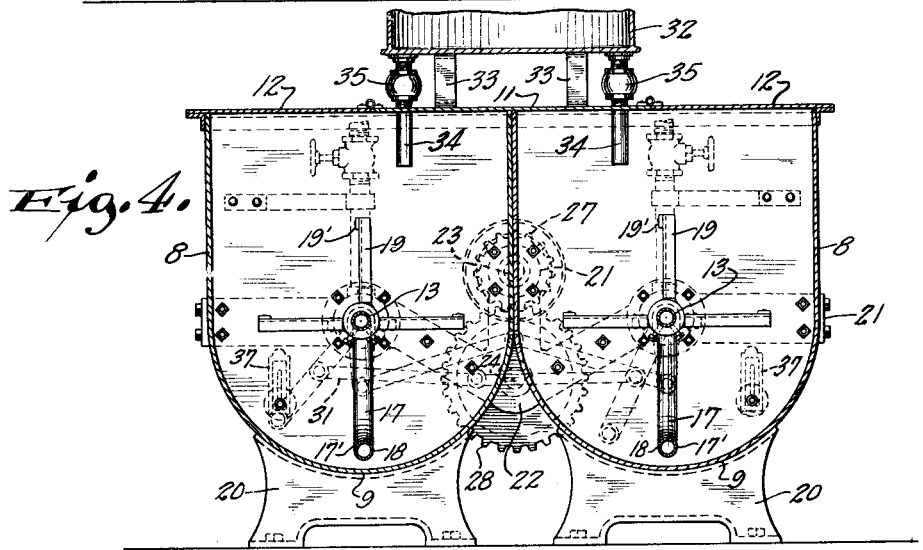
Fig. 4 is a transverse vertical sectional view taken on line 4—4 of Fig. 3.
Figure 5:
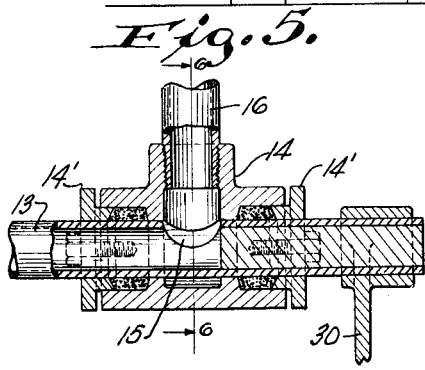
Fig. 5 is a sectional detail view of one of the rock shafts.
Figure 6:
Fig. 6 is a sectional detail view taken on line 6—6 of Fig. 5.

The tanks are supported upon frame legs 20 and are also connected together by a bracket frame 21 of angular formation, which is bolted to the front portions of the tanks. The rock shafts 13 extend through and are journaled in said bracket frame, and the frame is also formed with central bearings 21 and 22 in which are journaled short shafts 23 and 24. A loose pulley 25 is journaled on the outer end portion of the shaft 23 and next thereto a pulley 26 is mounted fast on the shaft to drive the same. A gear wheel 27 also mounted fast on the shaft 23 meshes with and drives a larger gear wheel 28 which is mounted fast on the lower short shaft 24. The gear 28 is provided with a wrist pin 29 and the outer end portions of the rock shafts 13 have depending crank arms 30 mounted fast thereon which are pivotally connected to the wrist pin by links 31 so that the rotation of the gear wheel 28 will rock the tubular shafts 13 as indicated by dotted lines in Fig. 4.

A brine tank 32 mounted in spaced relation on brackets 33 connected to the fixed portion 11 of the tank cover, has depending discharge pipes 34 which extend through the cover part 11 and into the tanks and are provided with valves 35 for controlling the amount of brine supplied to the tanks. A glass gauge 36 forming part of the brine tank permits view of the amount of brine being discharged from the brine tank.

The mixing tanks 8 are each provided with a gauge 37 to indicate the amount of material being mixed in each tank.

It is to be understood that the invention contemplates the use of one or more mixing tanks without departing from the spirit of the invention.

From the foregoing description it will be seen that it is only necessary to turn on the steam and start loading the tanks with the material to be heated and mixed and then open the brine tank valves to charge the mixing tanks with the desired amount of brine. As the U-shaped member oscillates it will direct the steam jets into different and constantly changing portions of the material being heated without liability of scorching same. The novel construction also provides for all portions of the material to be cooked to the same degree.

What I claim as my invention is:

1. In combination, a mixing tank, means for introducing material to be treated into said tank, a support oscillatable about a horizontal axis within said tank, a horizontal perforated tubular member depending from said support and movable thereby only through the lowermost portion of said tank, means for injecting fluid into said tank through the perforations of said member, and paddles carried by said support and movable thereby only through upper portions of said tank.

2. In combination, a mixing tank having a bottom curved about a horizontal axis extending longitudinally through said tank, means for introducing material to be treated into said tank above said axis, a horizontal perforated tubular member oscillatable about said axis and along said bottom only within the lowermost portion of said tank, means for injecting fluid into said tank through the perforations of said member, and paddles oscillatable about said axis only within upper portions of said tank.

3. In combination, a pair of adjacent mixing tanks each having a bottom curved about a horizontal axis extending longitudinally through said tank, means for introducing material to be treated into both of said tanks from above, a horizontal perforated tubular member oscillatable within the lowermost portion only of each of said tanks about said axis of curvature of the bottom, means for injecting fluid into each of said tanks through the perforations of the tubular member therein, paddles oscillatable within the upper portion only of each of said tanks about said axes, and common means for oscillating all of said tubular members and paddles in unison.

In testimony whereof I affix my signature.

FRANK D. CHAPMAN.